Feb. 21, 1956 G. W. FYLER 2,735,988

TELEVISION RECEIVER ANTENNA INPUT CIRCUIT

Original Filed April 24, 1947 2 Sheets-Sheet 1

INVENTOR.
George W. Fyler

BY Foorman L. Mueller

Attys

Feb. 21, 1956 G. W. FYLER 2,735,988

TELEVISION RECEIVER ANTENNA INPUT CIRCUIT

Original Filed April 24, 1947 2 Sheets-Sheet 2

INVENTOR.
George W Fyler
BY Forman L. Mueller
Attys.

United States Patent Office 2,735,988

Patented Feb. 21, 1956

2,735,988

TELEVISION RECEIVER ANTENNA INPUT CIRCUIT

George W. Fyler, Lombard, Ill., assignor to Motorola, Inc., Chicago, Ill., a corporation of Illinois Original application April 24, 1947, Serial No. 743,700, now Patent No. 2,530,329, dated November 14, 1950. Divided and this application September 8, 1950, Serial No. 183,729

4 Claims. (Cl. 333—70)

This invention relates generally to television receivers and in particular to a television receiver in which a high gain is obtained with a minimum number of tubes. This application is a division of my Patent No. 2,530,329 filed April 24, 1947, title, Television Receiver Antenna Input Circuit.

In prior television receivers in order to produce the gain required for providing a video signal suitable for modulating the cathode ray beam and for holding the deflection generators in synchronism, a very large number of stages of amplification and a corresponding large number of vacuum tubes have been required. This has resulted in television receivers being large, both because of the space required for the tubes and because a relatively large power supply is required for providing operating potentials for the tubes. Various attempts have been made to increase the gain of various stages of television receivers to thereby provide the over-all gain required in fewer stages, but difficulty has been encountered as the technique for handling signals in the frequencies now used for television and also the specific technique required for handling a carrier wave modulated by the wide band of frequencies are not well known.

In particular, antenna circuits used in prior art television circuits have been inefficient usually resulting in a large loss of signal strength, at least for some of the frequencies to be received. Further, due to the very high frequencies involved, inductances provided by leads, switches, etc., are relatively large making the components very critical and the manufacture and assembly thereof both difficult and expensive. These problems have often resulted in a poor match between the antenna and the first stage of the receiver resulting in little or no gain in the stage.

It is, therefore, an object of the present invention to provide an improved antenna circuit for a television receiver which is of simple construction and provides high signal gain.

A feature of this invention is the provision of a television receiver including an antenna circuit which may be efficiently connected to either a coaxial cable transmission line or a balanced line.

Further objects, features and many advantages will be apparent from a consideration of the following description taken in accordance with the accompanying drawings in which.

In practicing my invention I provide a wave signal receiver of the superheterodyne type capable of receiving television signals including modulated composite video signals and sound signals and deriving video synchronization, and sound signals therefrom. The receiver includes an antenna circuit having a coil with two closely coupled portions of such construction that one portion thereof provides an optimum matching impedance for a 75 ohm coaxial cable lead-in and the entire coil provides an optimum impedance to match a 300 ohm transmission line. The coil also forms part of a high pass filter for improving the intermediate frequency rejection ratio of the receiver. The received signal is applied from the filter to a tuned radio frequency stage and then may be handled in a standard manner to provide the reproduced picture and sound.

Figure 1:
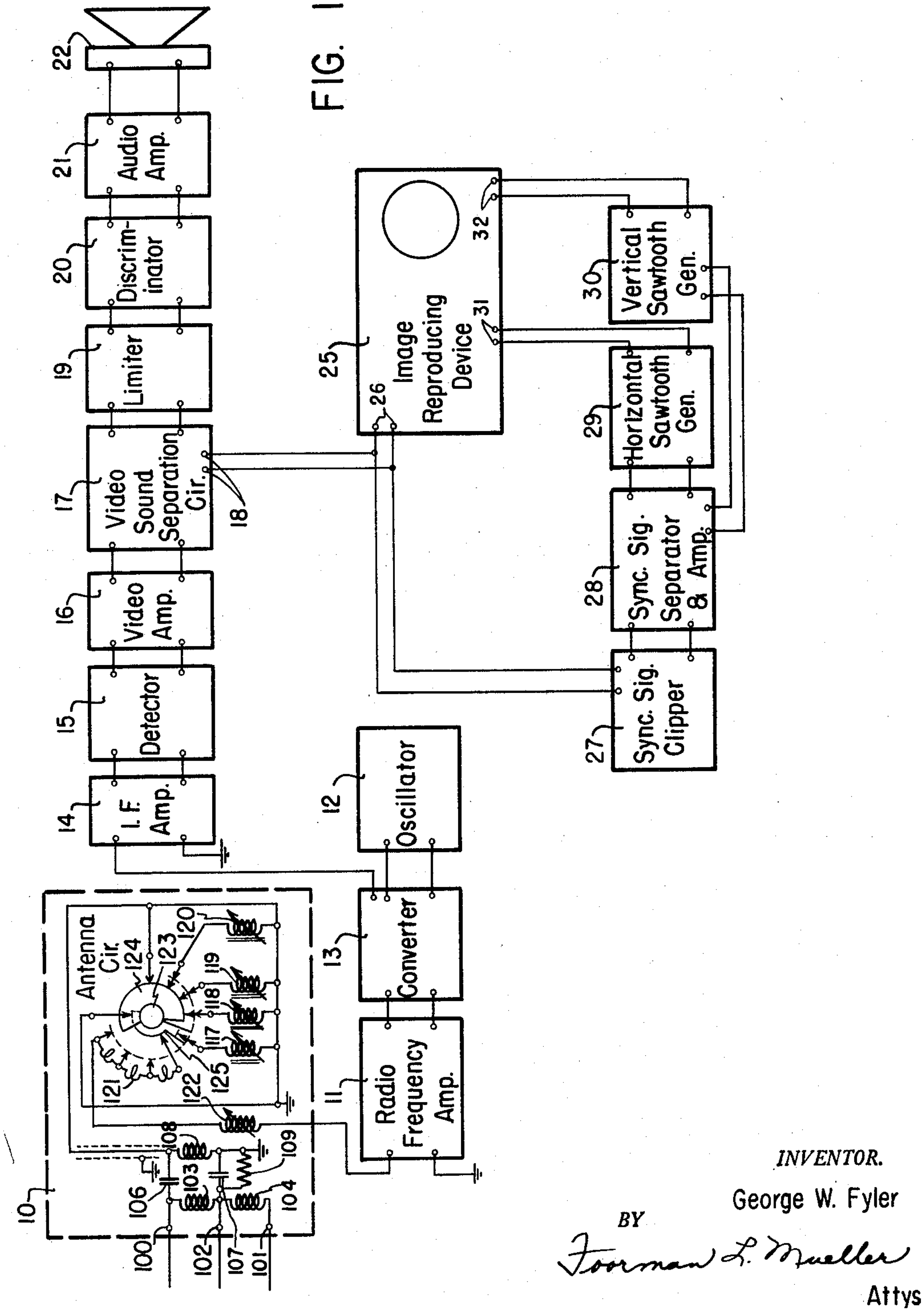
Fig. 1 is a circuit diagram of the television receiver in accordance with the invention.

Referring now to the drawings, Fig. 1 shows the circuit of the wave signal receiver in accordance with the invention with the components thereof which do not form a part of the invention shown in block diagram. The receiver is illustrated as including an antenna circuit 10 adapted to be connected to an antenna and to apply a signal therefrom to radio frequency amplifier 11. A tunable local oscillator 12 is provided which provides oscillations for converting the signals from the radio frequency amplifier into intermediate frequency signals. This function is accomplished in converter 13 from which the signals are applied to an intermediate frequency amplifier 14. The incoming signal includes two separate carrier waves, one modulated by the composite video signal and the other modulated by the audio signal, and these signals are converted into two separate intermediate frequency signals both of which are amplified in the intermediate frequency amplifier 14. The amplified intermediate frequency signals are applied to detector 15 wherein the video signal is derived from its carrier wave and the audio and video carrier waves are heterodyned to provide an audio frequency modulated carrier wave of a frequency which is the difference between the original audio and video carrier waves (4.5 mc.). The video signal and the low frequency audio modulated waves are amplified by video amplifier 16 and applied to video sound separation circuit 17. The video signal is derived from this circuit and applied to terminals marked 18. The audio signal is then applied to a limiter stage 19 and to discriminator 20 which may be of any well known type such as a ratio detector wherein the frequency modulated wave is converted to an amplitude modulated wave. The audio wave is further amplified in the audio amplifier 21 and then applied to the sound translating device 22.

The video signal appearing at the terminals 18 of the video sound separation circuit are applied to an image reproducing device 25, the signals being applied to terminals 26 connected to the control element thereof so that the intensity of the image reproducing beam is controlled by the signal strength. The video signal is also applied to a synchronization signal clipper 27 which removes the synchronization pulses from the composite video signal and applies them to synchronization signal separator and amplifier 28. The horizontal and vertical synchronization pulses are separated and individually applied to horizontal sawtooth generator 29 and vertical sawtooth generator 30 which are connected to terminals 31 and 32 of the image reproducing device 25 for energizing the horizontal and vertical deflecting means thereof. Either electromagnetic or electrostatic deflecting means may be used, the generators being adapted to provide either sawtooth current waves or sawtooth voltages waves depending on whether electromagnetic or electrostatic deflection is used. In order to simplify the illustration of the invention, the radio frequency, intermediate frequency, sound and image reproducing components are illustrated by block diagrams and the power supply system is not illustrated as these components do not constitute a part of the present invention.

Figure 2:
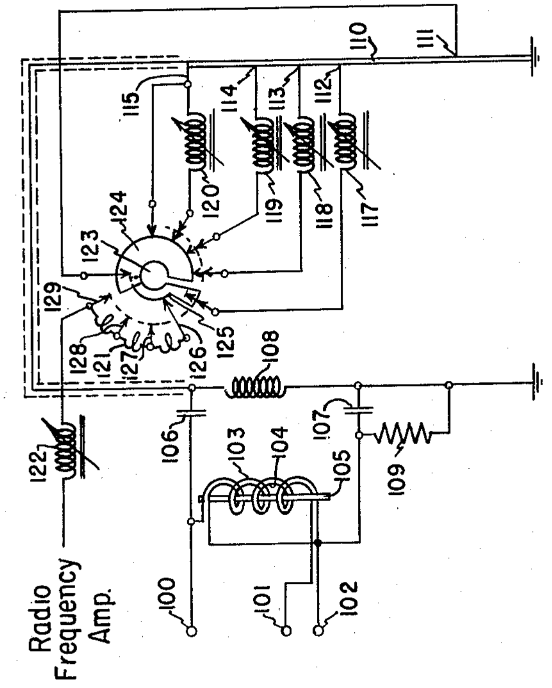
Fig. 2 is a schematic diagram illustrating the details of the improved antenna circuit.

Referring now more particularly to the antenna circuit 10, reference is made to Fig. 2 wherein the antenna circuit is shown in more detail. This circuit includes terminals 100, 101, and 102 which are connected to a coil composed of portions 103 and 104. The coil portion 103 is connected between terminals 100 and 102 and the coil portion 104 is connected between the terminals 102 and 101. The characteristics of the coil are so related to the impedance of the antenna circuit that the portion of the coil between the terminals 100 and 102 provides a proper impedance match for a 75 ohm coaxial unbalanced lead-in and the entire coil extending between terminals 100 and 101 provides an optimum matching impedance for a 300 ohm balanced transmission line. The inductance of the portion 103 is determined by well known formulas so that the cut-off frequency thereof is equal to the geometric mean between the highest intermediate frequency and the lowest radio frequency to be used. For a receiver adapted to operate on presently assigned television channels and with audio and video intermediate frequencies of 21.9 and 26.4 megacycles, respectively, this frequency is approximately 35 megacycles. The coil portion 104 is connected to terminal 101 with as short a lead as possible to minimize the coupled-in stray capacitance.

A satisfactory coil for use as described above can be provided by forming the two coil portions 103 and 104 of fine insulated wire which are twisted about each other and wound about a coil form as indicated at 105 (Fig. 2) so that the two portions thereof are very closely coupled. To cover present television frequencies, four turns of No. 40 wire were used as each portion, and the portions twisted about each other and wound on a ⅜ inch diameter form. This was found to provide the proper impedance for each portion and proper mutual coupling with reasonably good balance. In such a coil the coefficient of coupling between the two coil portions was found to be approximately .8.

Figure 3:
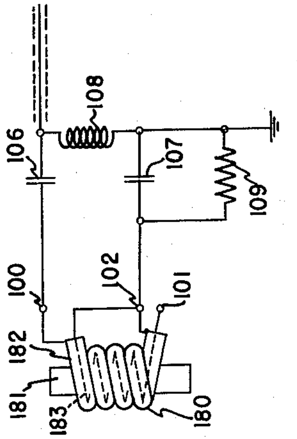
Fig. 3 illustrates a modified antenna coupling circuit.

An alternative arrangement found to be satisfactory as an antenna input coil is illustrated in Fig. 3. This coil comprises a piece of small concentric cable 180 wound about a small coil form 181. The cable includes an outer conductor 182 which is used in the same manner as coil portion 103 of Fig. 2 and a central conductor 183 which is used in the same manner as coil portion 104. A common connection is made at terminal 102 with the outer conductor at one end of the coil and the center conductor at the other end to form a circuit completely equivalent to that shown in Fig. 2. Such a coil provides a very high coefficient of coupling between the two conductors, approaching 100 per cent. In order to reduce the capacity of such a cable the diameter of the center conductor may be kept small.

Referring now to the operation of the input circuit, the coil portion 103 cooperates with capacitors 106 and 107 and inductor 108 to form a high pass input filter which improves the intermediate frequency rejection ratio of the receiver. The incoming signal is applied to a bus bar 110 which is a strip of material as illustrated in Fig. 2. The length of the bus bar 110 is such that the inductance thereof is optimum for coupling to the tube of the radio frequency amplifier at the lowest frequency to be received. The length required can be computed according to well known formulas based upon the input resistance of the radio frequency amplifier, the frequency to be received and the inductance of the bus bar per unit length. In computing the input impedance of the radio frequency amplifier, consideration must be given to the added circuit damping which may be required to achieve the desired band width, particularly on the lowest frequency channels. Thus, the value of resistor 109 is chosen to insure adequate band width on the lower channel.

In order to provide efficient transmission of the signal from the antenna circuit to the radio frequency amplifier on all the television channels, the bus bar 110 is tapped at points 111, 112, 113 and 114 which provide optimum coupling at the various channels. The points where the taps must be placed for the various frequencies can be computed as stated above. At the higher frequencies, a single tap can be used for more than one channel and in such cases a compromise point is used. Connection is made from the taps on the bus bar 110 to the radio frequency amplifier 11, through a plurality of inductors 117 to 121, inclusive, which may be selectively incircuited by switch 123 and through inductor 122. The switch 123 includes two separate movable contact members 124 and 125 which are mechanically connected for simultaneous movement but which are electrically insulated from each other. Contact member 125 makes the circuit connection for the desired channel and member 124 shorts the coils of lower frequency than the channel selected to prevent absorption points in the higher radio frequency bands. The coil 121 has a plurality of connections indicated at 126, 127, 128 and 129 so that various portions of the coil may be included in the circuit. It is noted that the contacts connected to coil 121 and the contacts connected to coils 117, 118, 119 and 120 are spaced so that they will be selectively engaged by the movable contact members 124 and 125. It is to be noted that the coils are connected in series in the channels in the high frequency band and in parallel in the channels in the lower frequency band to provide the desired coupling.

It is, therefore, seen that I have provided a television receiver in which the antenna circuit is improved. The antenna circuit permits the receiver to be coupled to either a coaxial lead-in or a balanced 300 ohm transmission line. The same elements providing the impedance transformation also serve as a part of a high pass filter to improve intermediate frequency rejection and improve the overall operation of the receiver. The coupling components in accordance with the invention are much simpler to construct and are less critical than in systems heretofore used at the higher frequencies now used for television.

Although I have described certain embodiments which are illustrative of my invention, it is apparent that various changes and modifications can be made therein without departing from the intended scope of the invention as defined in the appended claims.

I claim:

1. In a television receiver having a radio frequency amplifier with a tuned circuit for selecting signals in a band between a first high frequency and a second low frequency and having an intermediate frequency amplifier tuned to a third predetermined frequency less than said second low frequency, the antenna circuit for matching a transmission line to the television receiver and to filter signals passed therethrough including in combination, a coil having a center terminal and two end terminals defining two series connected substantially identical coil portions, one portion providing impedance match for a 75 ohm transmission line and the two portions together providing match for a 300 ohm transmission line, said coil being formed by a pair of conductors wound together on a form of small diameter to provide maximum coupling therebetween, said one portion of said coil being of such impedance that the same provides substantial cutoff of signals below a frequency substantially midway between said second low frequency and said third predetermined frequency, inductance means having a first part connected to ground and a second part connected to said first part and to the tuned circuit in the radio frequency amplifier for coupling signals to the same, and a pair of capacitors interconnecting the ends of said first part of said inductance means to the ends of said one portion of said coil whereby said one portion of said coil, said pair of capacitors and said first part of said inductance means provide a high pass filter to reject signals below said second low frequency, and said second part of said inductance means provides impedance matching for applying signals to the radio frequency amplifier.

2. In a television receiver having a radio frequency amplifier with a tuned circuit for selecting signals in a band between a high selected frequency and a low selected frequency and having an intermediate frequency amplifier tuned to a predetermined frequency less than said low selected frequency, the antenna circuit for matching a transmission line to the television receiver and to filter signals passed therethrough, said antenna circuit including in combination, a coil having a center terminal and two end terminals defining two series connected substantially identical coil portions, one portion providing impedance match for a 75 ohm transmission line and the two portions together providing match for a 300 ohm transmission line, said coil being formed by a pair of conductors wound together on a form of small diameter to provide maximum coupling therebetween, said one portion of said coil being of such impedance that the same provides substantial cutoff of signals below a frequency between said low selected frequency and said predetermined frequency, inductance means having a first portion connected to ground and a second tapped bus bar portion connected to said first portion and to the tuned circuit in the radio frequency amplifier for impedance matching at said low selected frequency, a pair of capacitors interconnecting the ends of said first portion to the ends of said one portion of said coil whereby said one portion of said coil, said pair of capacitors and said first part of said inductance means provide a high pass filter to reject signals below said low selected frequency and impedance matching is provided for the radio frequency amplifier by said second bus bar portion of said inductance means, and resistor means coupled across one of said capacitors to provide a predetermined band pass through said filter for a signal of said second low frequency.

3. An antenna circuit in accordance with claim 1 wherein said coil includes a pair of fine wires twisted about each other which form said pair of conductors of said coil.

4. An antenna circuit in accordance with claim 1 wherein said coil includes a section of coaxial cable having a center conductor and an outer conductor which form said pair of conductors of said coil.

References Cited in the file of this patent

UNITED STATES PATENTS

| | | |
|---|---|---|
| 1,604,981 | Elsasser | Nov. 2, 1926 |
| 1,767,951 | Whittle | June 24, 1930 |
| 1,841,639 | Schmidt | Jan. 19, 1932 |
| 1,844,501 | Davis | Feb. 9, 1932 |
| 2,151,081 | Carlson et al. | Mar. 21, 1939 |
| 2,159,546 | Bauer et al. | May 23, 1939 |
| 2,196,673 | Gutzmann | Apr. 9, 1940 |
| 2,436,129 | Weathers | Feb. 17, 1948 |
| 2,448,036 | Libby | Aug. 11, 1948 |
| 2,469,168 | Loughlin | May 3, 1949 |
| 2,470,307 | Guanella | May 17, 1949 |